April 25, 1939.  A. MAINIERI  2,155,729
MITER JOINT
Filed April 28, 1938   2 Sheets-Sheet 1
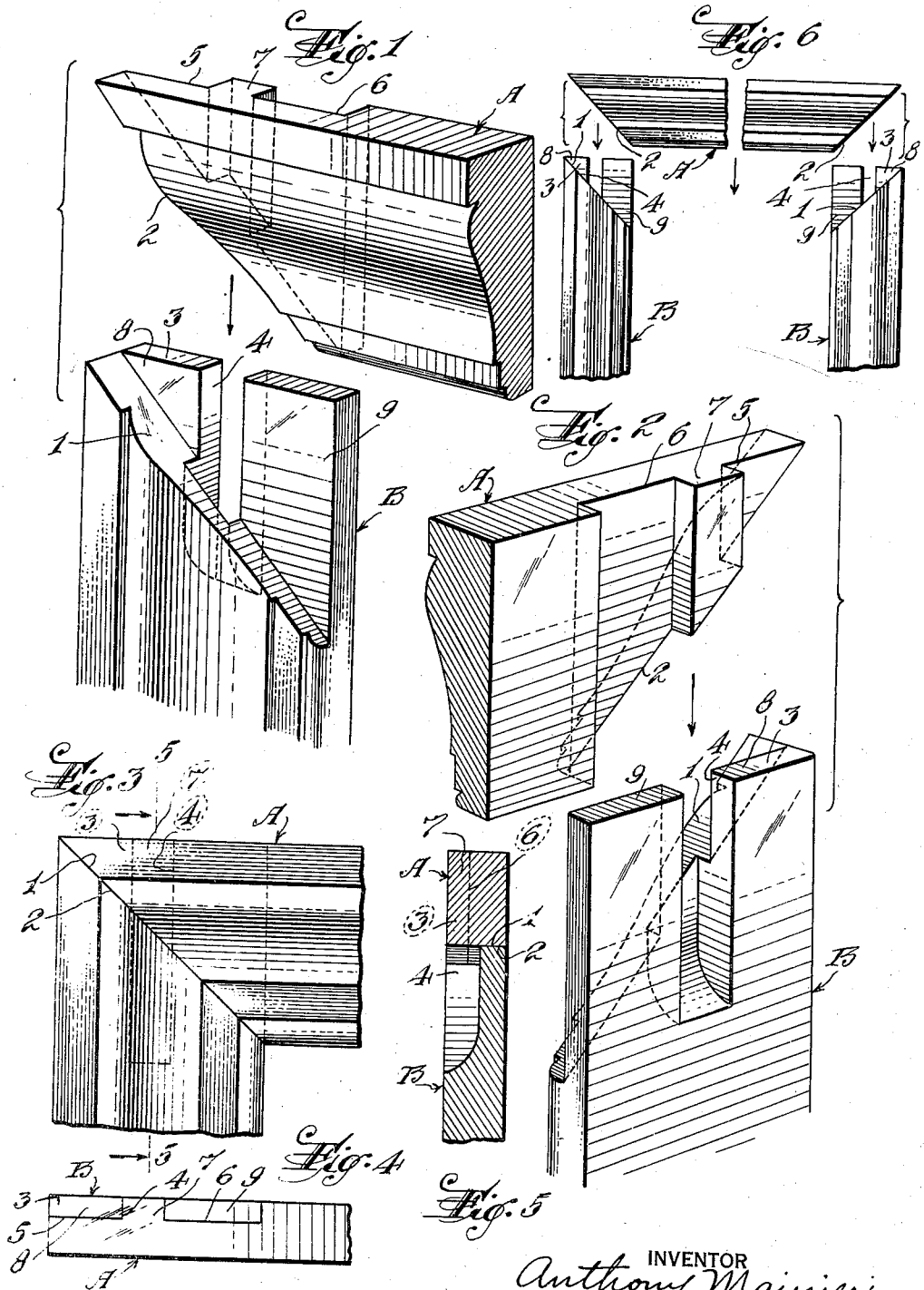
INVENTOR
Anthony Mainieri,
BY
Harry B. Rook,
ATTORNEY April 25, 1939.  A. MAINIERI  2,155,729
MITER JOINT
Filed April 28, 1938  2 Sheets-Sheet 2
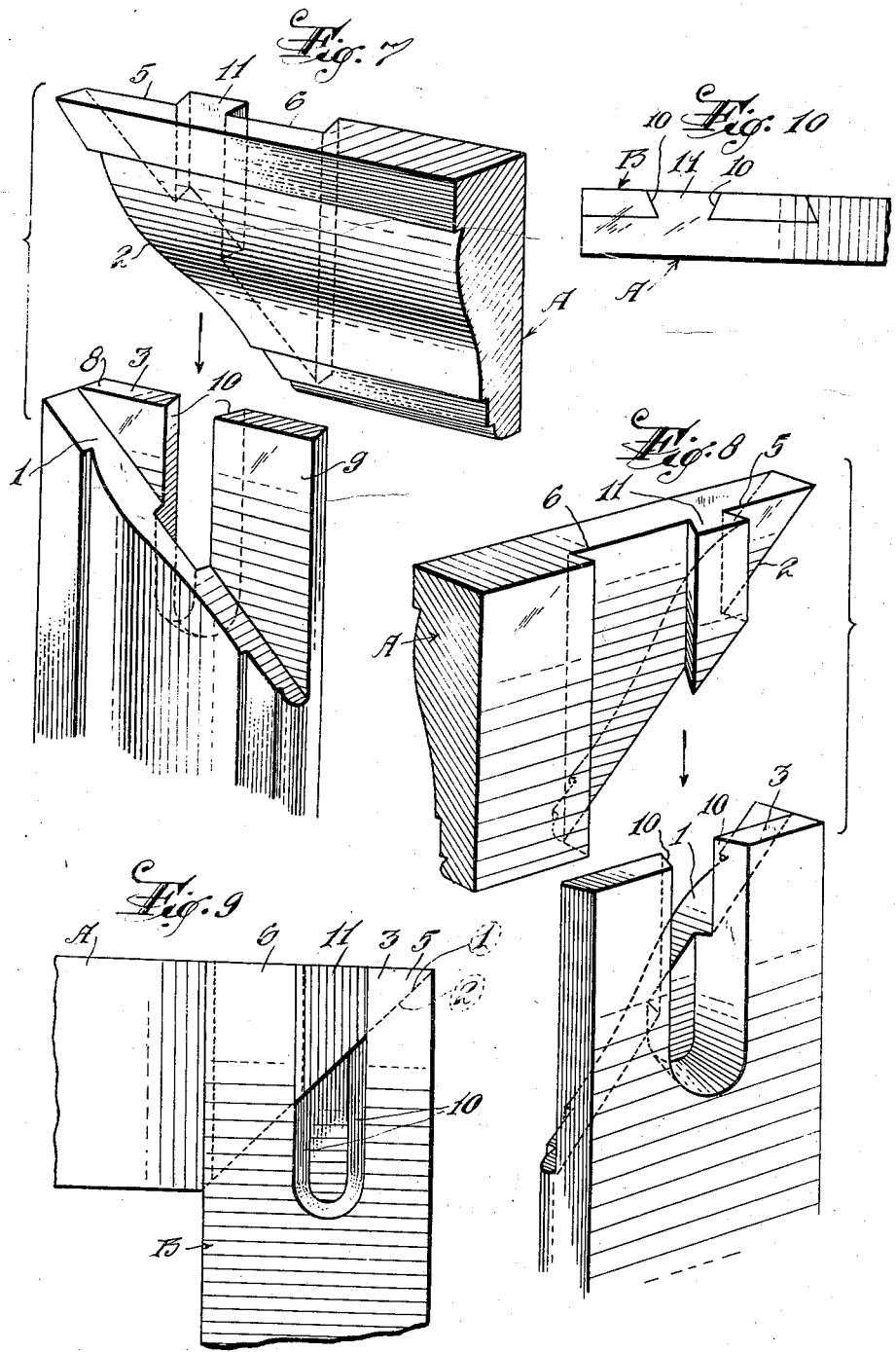

Patented Apr. 25, 1939

2,155,729

UNITED STATES PATENT OFFICE 2,155,729

MITER JOINT

Anthony Mainieri, Cliffside, N. J., assignor to General Woodcraft Co., Inc., North Bergen, N. J., a corporation of New Jersey Application April 28, 1938, Serial No. 204,799

2 Claims. (Cl. 20—92)

This invention relates in general to miter joints, and more particularly to miter joints for window and door trim.

One object of the invention is to provide a novel and improved miter joint for use in connecting two sections in angular relation to each other, whereby the two sections may be easily and quickly assembled and connected and the joints shall be strong and inexpensive.

Another object is to provide a miter joint that is especially adaptable for use in trim for doors and windows and which shall greatly facilitate the assembly of the side sections and head sections of such trim. It is a feature of the invention that the joint permits the assembly of the head and side sections of door and window trim at the place of installation, the joint permitting the side sections to be installed first and thereafter allowing the head sections to be moved vertically downwardly and longitudinally of the side sections in the common plane of all of the sections.

A further object is to provide such a miter joint which shall have a novel and improved construction and combination and arrangement of mitered abutment surfaces, tongues, grooves and rabbets on the adjoining sections, whereby as the ends of the head section are brought into engagement with the side sections, the various sections are automatically drawn into proper and tight fitting relation to each other and the tongues and recesses form stops to insure accurate contact of the mitered abutment surfaces.

Other objects, advantages and results of the invention will appear from the following description and the accompanying drawings in which Figure 1 is a composite disassembled perspective view of two of the sections composing the miter joint, viewing the sections from the front or face thereof.

Figure 2 is a similar view showing the rear or back of the sections.

Figure 3 is a fragmentary front elevational view of the assembled joint.

Figure 4 is a top plan view thereof.

Figure 5 is a vertical longitudinal sectional view on the line 5—5 of Figure 3.

Figure 6 is a composite front elevational view of the side sections and head section of a door or window trim in disassembled relation, showing the manner of assembling the sections.

Figures 7 and 8 are views similar to Figures 1 and 2 respectively, showing a modification of the invention.

Figure 9 is a rear elevational view of the sections of the joint shown in Figures 7 and 8 in assembled relation, and Figure 10 is a top plan view of the assembled joint shown in Figure 9.

Specifically describing the invention, the reference characters A and B designate two sections of the miter joint. Specifically, as shown, the section B constitutes the side section of a door or window trim while the section A constitutes the head section.

The section B has a mitered abutment surface 1 for abutting relation to a correspondingly mitered abutment surface 2 on the section A. The angle of the abutment surfaces will be varied in accordance with the angle at which it is desired to connect the two sections.

The section B also is rabbeted to form a wing 3 which extends from the abutment surface 1 longitudinally of the section and is of a width corresponding to the width of the section. The wing 3 has a recess or slot 4 extending longitudinally of the wing and section from the abutment surface and opening through the end of the wing.

The end of the section A has two rabbets 5 and 6 with a tongue 7 therebetween, extending transversely across the rear side of the section from the abutment surface 2 to the outer longitudinal edge of the section. The rabbets 5 and 6 are of a size and shape to snugly receive the respective portions 8 and 9 of the wing 3 at opposite sides of the recess or slot 4, while the slot 4 is of a size and shape to snugly slidably receive the tongue 7.

In assembling the sections A and B, the two sections are arranged at angles to each other corresponding to the angle at which they are to be connected, specifically as shown at right angles, and then moved toward each other in their own plane so as to cause the sections 8 and 9 of the wing 3 to slidably enter the rabbets 5 and 6 and also cause the tongue 7 to slidably enter the slot or recess 4. This action is continued until the surfaces 1 and 2 abut each other. The surfaces 1 and 2 are limited against relative sliding movement by the engagement of the sides of the tongue 7 with the sides of the slot 4, and therefore the two sections are brought into accurate relation to each other without any special care on the part of the workman. The combination of the engagement of the abutment surfaces 1 and 2 with each other and the engagement of the sides of the tongue 7 with the walls of the slot 4, insures the sections being brought into tight fitting relation to each other with a locking or wedging action.

When the joint is used in door and window trim, it has special advantages in that it permits the erection of the side sections, and then the bringing down of the head section as shown in Figure 6. The joint thus renders it unnecessary to assemble the sections before erection thereof, and greatly facilitates the assembly of the sections at the point of erection. Moreover, due to the fact that the lower ends of the side sections usually are supported at the lower ends either by a sill, stool or floor, a firm support of the head section is provided which permits the driving of nails downward from the top edge of the head section through the abutment surfaces 1 and 2, whereby to insure tight contact of said surfaces and a joint that is neat in appearance.

This particular form of joint also permits the assembly of the sections facewise or in a direction at right angles to the general plane of the sections, where that is desirable.

Should it be desired to prevent relative movement of the connected sections in directions at angles to their general plane after assembly of the sections, the groove or recess may be dovetailed as indicated at 10, while the tongue 11 may be correspondingly dovetailed, all as shown in Figures 7 to 10 inclusive.

The joint shown in Figures 7 to 10 inclusive is otherwise the same as that hereinbefore described, but has the advantage over the joint shown in Figures 1 to 5 inclusive in that the sections after assembly cannot be moved relatively in any direction except longitudinally of the side sections toward the upper end thereof in the general plane of the sections.

It will be observed that in both forms of the joint, the sides of the side section are in no way defaced by the joint, and especially where the joint is used in door and window trim the lines of contact of the rabbets and slot with the wing and tongue at the longitudinal edge of the head section usually will be above the normal vision line when the trim is installed so as to be normally invisible.

The invention thus provides an easily and quickly assembled joint that is strong, inexpensive and neat in appearance.

While I have shown and described two preferred embodiments of the invention, it should be understood that this is primarily for the purpose of illustrating the principles of the invention and that the details of structure of the joint may be modified and changed without departing from the spirit and scope of the invention. For example, the number and shape of the tongues 5 and corresponding slots 4 may be modified, and the shape and relative location of the rabbets 5 and 6, wing portions 8 and 9, slot or recess 4 and tongue 7 may be changed to suit different conditions.

Having thus described my invention, what I claim is:

1. Window and door trim comprising a head section and a side section, each having at one end a mitered abutment surface in abutting relation to the corresponding surface of the other, the side section having a rear integral wing extending longitudinally of the section beyond the corresponding abutment surface and having a recess extending longitudinally of said wing from said abutment surface through the end of the wing, and the head section having parallel rabbets and a tongue between them extending transversely across the rear side of the section from the corresponding abutment surface to one edge of the section, said rabbets receiving the portions of said wing at opposite sides of said recess and said tongue slidably fitting said recess.

2. A miter joint including two sections each having at one end a mitered abutment surface for abutting relation to the corresponding surface of the other, one section having an integral wing extending longitudinally of the section beyond the corresponding abutment surface and having a recess extending longitudinally of said wing from said abutment surface through the end of the wing, and the other section having parallel rabbets and a tongue between them extending transversely of the section from the corresponding abutment surface to the longitudinal edge of the section, said rabbets to receive the portions of said wing at opposite sides of said recess and said recess to slidably receive said tongue, whereby said sections can be assembled by relative movement thereof at right angles to each other in their common plane.

ANTHONY MAINIERI.